United States Patent
Tuller et al.

(10) Patent No.: US 7,142,760 B2
(45) Date of Patent: Nov. 28, 2006

(54) STABILIZED TITANATE THIN FILM STRUCTURES

(75) Inventors: Harry L. Tuller, Wellesley, MA (US); Ytshak Avrahami, Arlington, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 74 days.

(21) Appl. No.: 10/646,098

(22) Filed: Aug. 22, 2003

(65) Prior Publication Data

US 2004/0264909 A1 Dec. 30, 2004

Related U.S. Application Data

(60) Provisional application No. 60/405,297, filed on Aug. 23, 2002.

(51) Int. Cl.
G02B 6/10 (2006.01)
G02F 1/035 (2006.01)

(52) U.S. Cl. ............... 385/130; 385/2; 385/8; 385/40

(58) Field of Classification Search ........... 385/2, 385/8–10, 14, 40, 129–132
See application file for complete search history.

(56) References Cited

U.S. PATENT DOCUMENTS

| | | | |
|---|---|---|---|
| 4,019,915 A | 4/1977 | Miyauchi et al. | |
| 5,198,269 A * | 3/1993 | Swartz et al. | 427/226 |
| 5,225,031 A | 7/1993 | McKee et al. | |
| 6,103,008 A * | 8/2000 | McKee et al. | 117/2 |
| 6,122,429 A | 9/2000 | Wessels et al. | |
| 6,303,393 B1 | 10/2001 | Wessels et al. | |

OTHER PUBLICATIONS

Rehrig et al. "Piezoelectric properties of zirconium-doped barium titanate single crystals grown by templated gain growth", Journal of Applied Physics, vol. 86, No. 2, Aug. 1, 1999, pp. 1657-1661.*

"Temperature dependence of electromechanical properties and strain in barium titanate hafnate transducers," Tawfik et al. *Journal of Materials Science Letters*. 1986. p. 305-306.

"Piezoelectric Ceramics," *Piezoelectric Ceramics, Non-Metallic Solids*. London. Academic Press. GB. vol. 3, pp. 53-114.

"Piezoelectric properties of zirconium-doped barium titanate single crystals grown by templated grain growth," Rehrig et al. *Journal of Applied Physics*. vol. 86, No. 3. Aug. 1999.

* cited by examiner

Primary Examiner—Michelle Connelly-Cushwa
(74) Attorney, Agent, or Firm—Goodwin Procter LLP (57) ABSTRACT

An optical structure is provided. The optical structure includes a substrate having a surface. A modified barium titanate is deposited on the surface of the substrate.

6 Claims, 10 Drawing Sheets

STABILIZED TITANATE THIN FILM STRUCTURES

PRIORITY INFORMATION

This application claims priority from provisional application Ser. No. 60/405,297 filed Aug. 23, 2002, which is incorporated herein by reference in its entirety.

BACKGROUND OF THE INVENTION

A thin-film layer of a ferroelectric material, such as a perovskite, for example, BaTiO3, can be grown directly upon a semiconductor-based material, such as silicon or other Group III–V, Group IV or Group II–VI materials, to form a monolithic structure that possesses both semiconductor and ferroelectric properties. The ferroelectric material and silicon substrate can be used as an active waveguide material in a silicon-based device for use in communication systems. See, for example, U.S. Pat. No. 6,122,429, which is incorporated herein by reference in its entirety. The device can be an electro-optic device.

In general, high-speed optical communications requires optical modulation at radio frequencies (RF). Materials with a high electro-optic (E-O) coefficient can be of great interest for such applications, as these materials can form devices having smaller dimensions and lower operating voltages.

SUMMARY OF THE INVENTION

According to one aspect of the invention, there is provided an optical structure. The optical structure includes a substrate having a surface. A modified barium titanate is deposited on the surface of the substrate.

According to another aspect of the invention, there is provided a method of forming an optical structure. The method includes providing a substrate having a surface, and depositing modified barium titanate on the surface of the substrate.

DETAILED DESCRIPTION OF THE INVENTION

A barium titanate-based (BaTiO$_3$) material can have a high electro-optic (E-O) coefficient. Some additives, such as Zr and Hf, can lower the Curie point and raise the stability of the orthorhombic and rhombohedral phases to high temperature. In addition, the addition of appropriate additives, such as those mentioned above, can contribute to the lowering of the dielectric constant, while maintaining a high electro-optic coefficient. The stabilized titanate can have a higher-electro-optic coefficient than non-stabilized titanate.

Figure 1A:
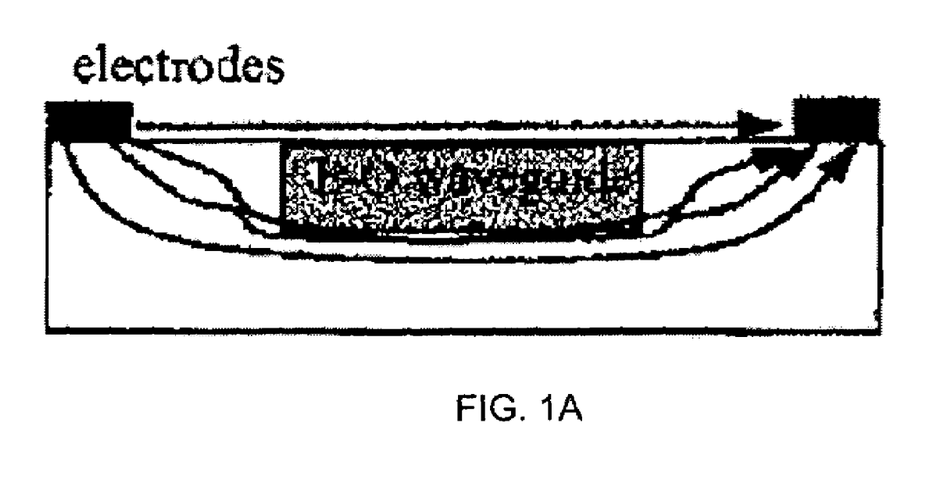
FIG. 1A is a schematic diagram of the electric field in the cases of a high dielectric field material.
Figure 1B:
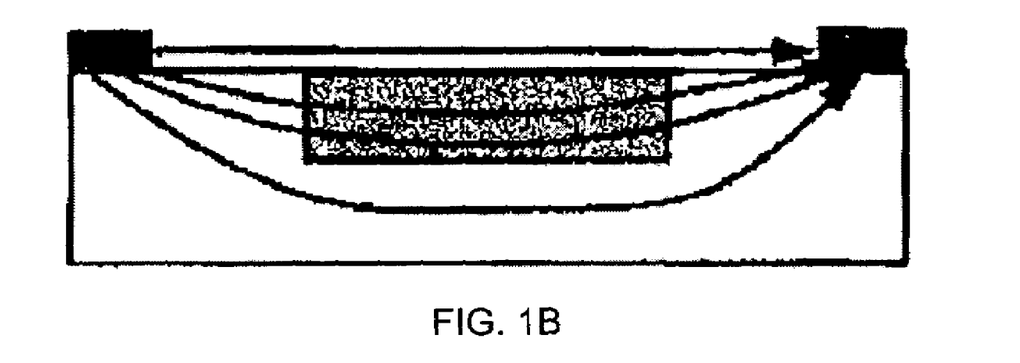
FIG. 1B is a schematic diagram of the electric field in the cases of a low dielectric.

BaTiO$_3$ has a high electro-optic coefficient, but its use as an electro-optic material is limited due to its high dielectric constant in the RF. The effect of dielectric constant on the penetration of the electric field into the E-O material can be seen in FIGS. 1A–1B, which indicates the effect on electric field in, as shown in FIG. 1A, a high dielectric constant material. FIG. 1B indicates the effect on electric field in a low dielectric constant material.

The change in index (Δn) in the presence of electric field (E) is given by $$\Delta n \alpha r E \qquad \text{Eq. 1}$$

where r is the electro-optic coefficient. The high dielectric constant makes it difficult for the RF field to penetrate the material thereby creating a reduced effective field and therefore a reduced electro-optic response.

A stabilized barium titanate, that includes a fraction of a stabilizer additive, such as Zr or Hf, can be a film on a substrate, such as silicon or an insulator material, such as magnesium oxide. The characteristics of the structure are strongly affected by the phase transformations, the thermal contraction, and/or lattice mismatch between the material layers, which can be altered by the stabilizer additive.

The material can be used to form an optical waveguide, optical amplifier, electro-optic modulator device, laser and other optical devices for use in integrated optics including a stabilized barium titanate thin film on a substrate as an active or passive optical working medium. The barium titanate can form a waveguide structure on the substrate. See, for example, U.S. Pat. Nos. 6,303,393 and 6,103,008, each of which is incorporated herein by reference in its entirety.

An optical buffer layer may be needed to confine the optical signal within the modified barium titanate layer. The buffer layer should have a refractive index lower than the modified barium titanate, and low optical loss. It may be desirable for the buffer layer to have good lattice and thermal expansion match to the modified barium titanate.

An MgO film buffer layer, for example, can be grown in a layer-by-layer fashion upon an underlying silicon substrate by molecular beam epitaxy (MBE). See, for example, U.S. Pat. No. 5,225,031, which is incorporated herein by reference in its entirety. Since the barium titanate film can serve as a waveguide for light transmitted through the structure, the MgO film serves to optically isolate the barium titanate film from the silicon substrate, as well as provide a stable structure upon which the barium titanate is grown. The thickness of the MgO film can be selected to provide satisfactory optical isolation for the barium titanate film.

As alternatives to MgO, a layer of YSZ (i.e., yttria stabilized zirconia), CeO$_2$, SiO$_2$, or a combination thereof can be grown on the silicon substrate to serve as a buffer layer upon which to grow the barium titanate. Other materials with similar optical and structural properties can be selected.

Figure 2:
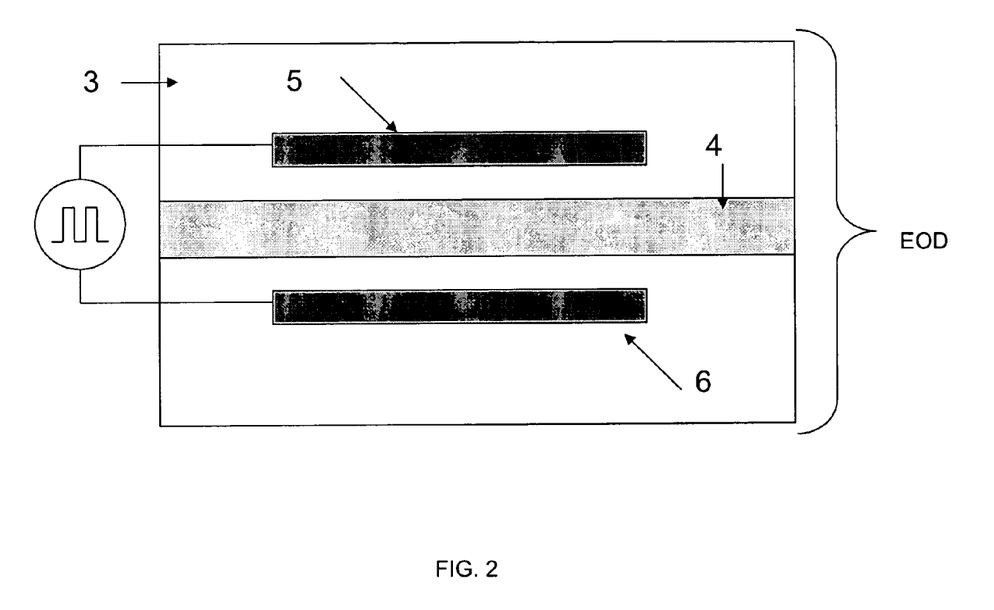
FIG. 2 is a plan view of an electro-optic device.
Figure 3:
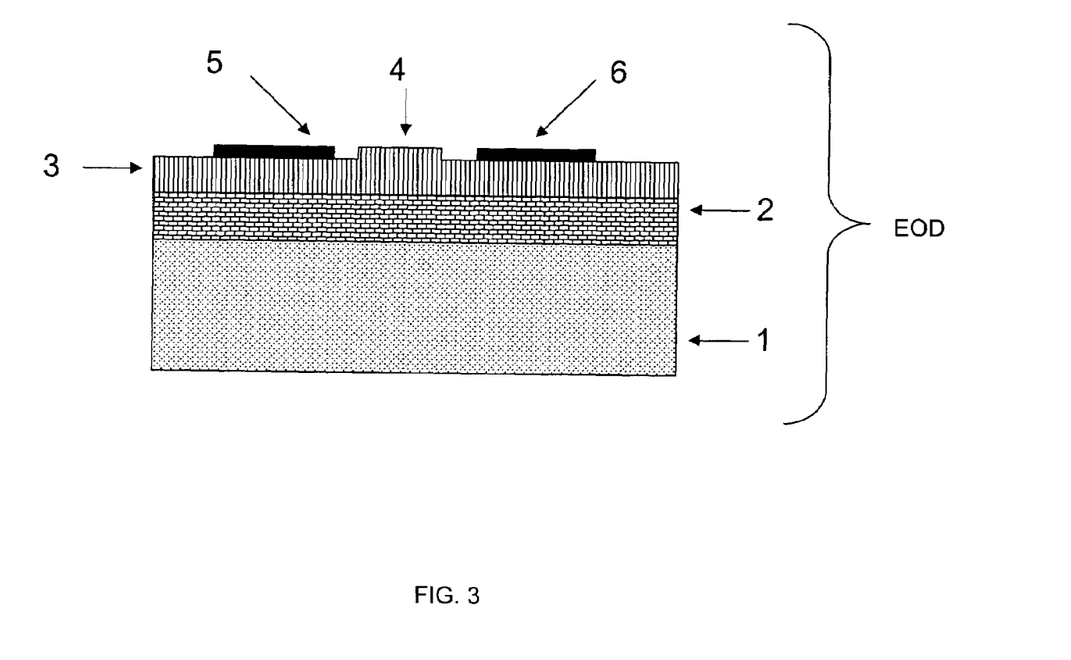
FIG. 3 is a cross-sectional view of the device taken about along line 5—5 of FIG. 2.

Referring to FIGS. 2 and 3, an electro-optic device (EOD) includes a substrate 1 (e.g., silicon), and intermediate optical buffer layer 2 (e.g., MgO) and a barium titanate layer 3 overlaying the intermediate layer. An optical waveguide 4 is produced in the barium titanate layer 3. The waveguide can be a buried waveguide or a ridge waveguide.

An electric field can be applied between electrodes 5 and 6 positioned across the waveguide 4. The device can be used as a phase modulator in which the film serves as the waveguide through which a beam of light is transmitted and across which an electric field is applied and controlled in a manner to alter the phase of the light beam transmitted through the barium titanate film.

Figure 4:
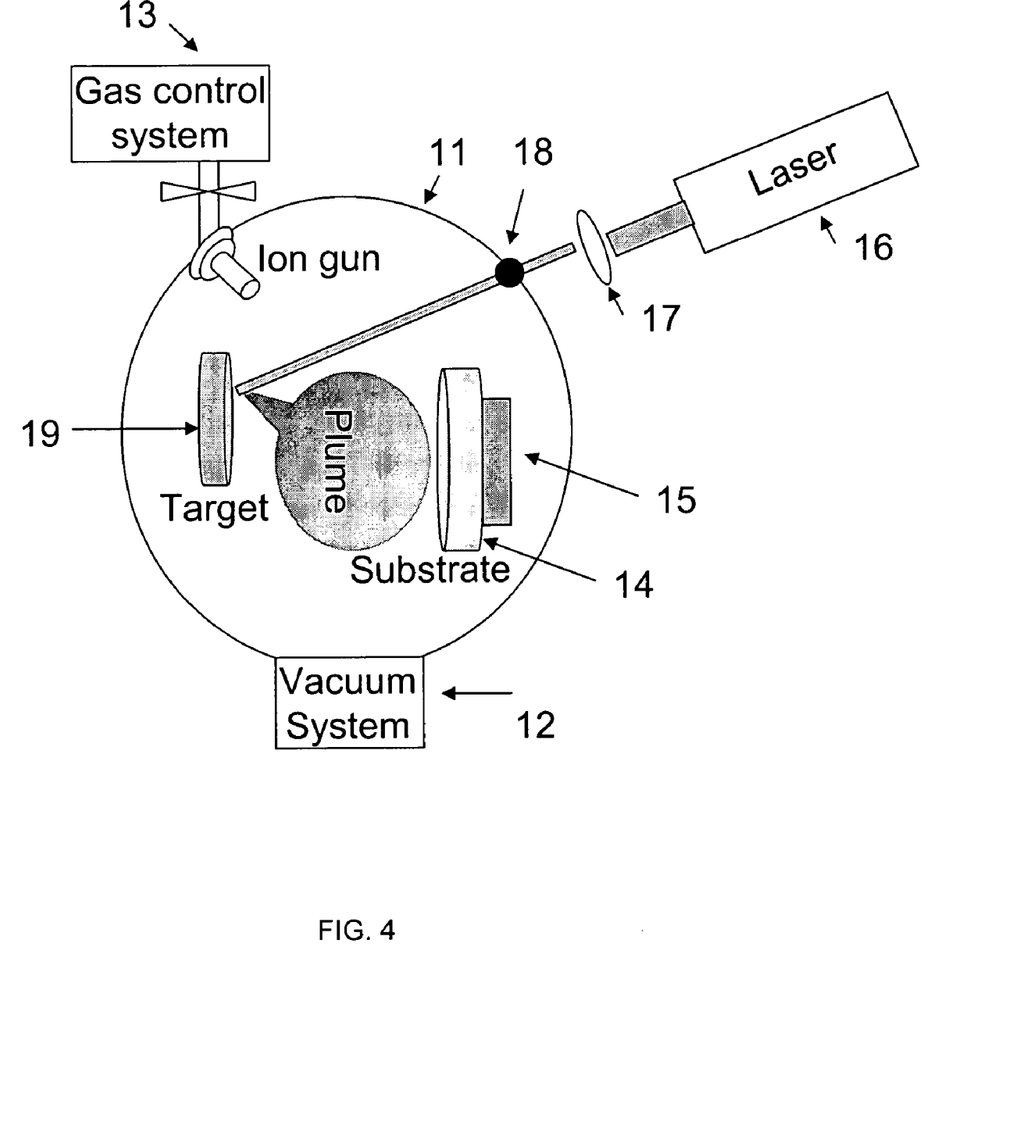
FIG. 4 is a schematic diagram illustrating an example of a deposition apparatus.

The stabilized barium titanate can be deposited on the substrate, for example, by pulsed laser deposition (PLD). PLD is described, for example, in U.S. Pat. No. 6,204,525, which is incorporated herein by reference in its entirety. FIG. 4 is a schematic diagram illustrating an example of a PLD apparatus. The PLD apparatus includes a chamber 11 connected to a vacuum pump 12. The chamber is pumped down to pressure below $1\times10^5$ [Torr], and then gas is introduced through the gas control system 13. In the vacuum chamber 11, a substrate 14 is placed on a substrate heater 15. A pulsed laser beam is produced by a KrF laser 16, focused using a moving lens 17, and introduced into the chamber through a window 18. The laser beam is focused on the target 19, producing a plume of particles that deposits on the substrate 14, forming a film of the target composition. Other deposition techniques are possible, including sputtering, evaporation, molecular beam epitaxy, chemical vapor deposition, and metal-organic deposition.

Stabilized barium titanate materials can be used in optical applications. For example, barium titanate can be used as a waveguide material for integration on a silicon or SOI (silicon on insulator) substrate. In such a use, orientation and phase stability of the material are important factors in determining suitability of the material. Growth temperature can influence these properties.

When barium titanate (BT) is deposited on a magnesium oxide substrate, there is a lattice mismatch ($a_{BT}$=3.994; $a_{MgO}$=4.2112). Reducing lattice mismatch can result in lower processing temperature for the material. Stabilizers such as Zr and Hf can form solid solutions in barium titanate. By stabilizing barium titanate with Zr or Hf, the lattice parameter increases, which reduces mismatch. Advantageously, stabilization of barium titanate with Zr or Hf is an iso-valent substitution, which results in no net charge change in the material.

It is found that appropriate stabilizers can be Zr, preferably in a range between 2 and 20 mol % of Zr ($BaZrO_3$) or Hf, preferably in a range between 2 and 20 mol % of Hf ($BaHfO_3$).

Alternative stabilizers are potassium niobate ($KNbO_3$), preferably in a range of 2 to 12 mol %, or Sn, preferably in a range between 4 and 14 mol % of Sn ($BaSnO_3$).

In a still further alternative, a mixture of the above substances can be used as a stabilizer.

Stabilized barium titanate films can be grown on a substrate, such as MgO, by PLD. This method has a high deposition rate and maintains stoichiometry of the target material in the product. The target material is prepared by forming a solid solution of barium titanate and the stabilizer. Solid-state reaction is effected by mixing and ball milling oxide powders, heating, for example to 300–900° C. (e.g., around 700° C.), and sintering at 1000–1600° C. (e.g., around 1200° C.). The sintered material can be crushed, ball milled, pressed, and sintered at 1100–1500° C. (e.g., around 1200–1400° C.).

To demonstrate a working example, films of stabilized barium titanate were formed on MgO substrates. The target was prepared by mixing and ball milling oxide powders, heating to 700° C., sintering at 1200° C., crushing the product, ball milling, pressing, and sintering at 1200–1400° C. The PLD system used to form the films employed a KrF laser @=248 nm) at a temperature in the range of 450–720° C. with a fluency in the range of 2.5–5 J/cm², in an atmosphere of 2.4 mTorr $O_2$.

Figure 5:
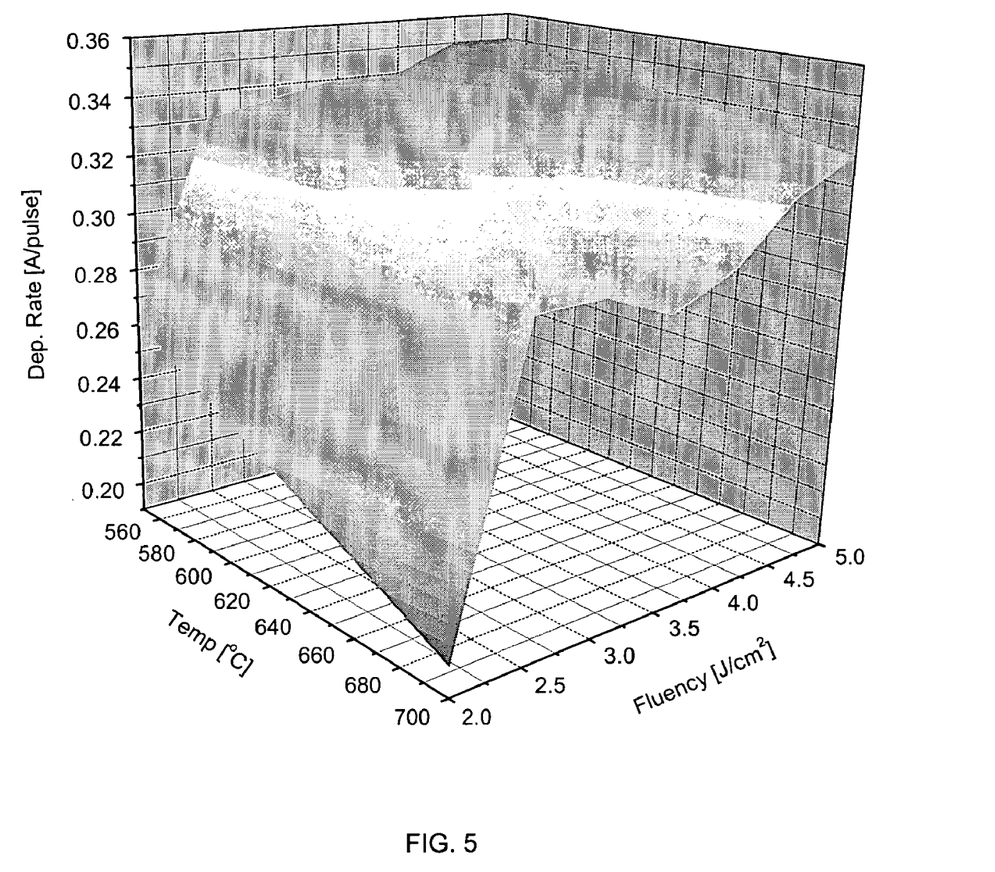
FIG. 5 is a graph depicting deposition characteristics of the titanates.

The film thickness varied between 0.5–1.7 microns. The surface roughness was RRMS<2 nm. The growth rates for pure barium titanate were similar to that of solid solutions. In particular, the growth rate at 20 Hz was about 38 nm/min and at 30 Hz was about 58 nm/min. The deposition rate dependence on fluency and temperature is shown in FIG. 5.

Figure 6A:
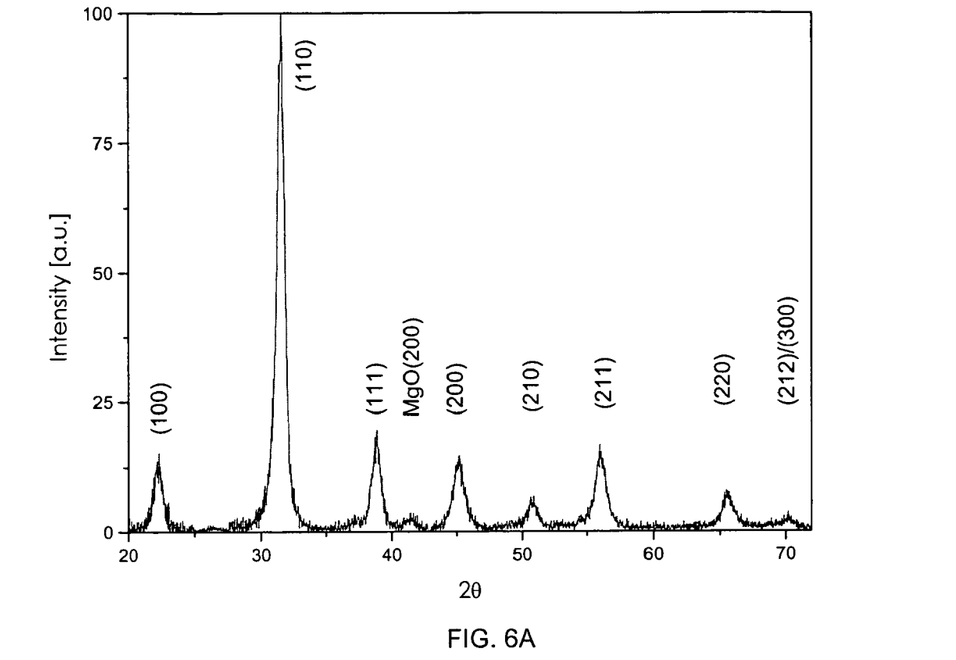
FIGS. 6A and 6B are graphs depicting x-ray diffraction characteristics of the titanates.
Figure 6B:
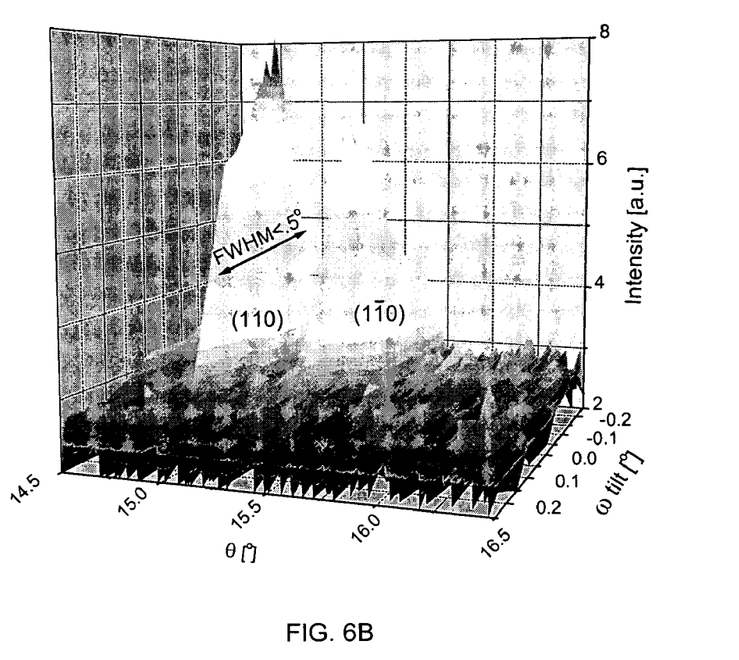
Figure 7:
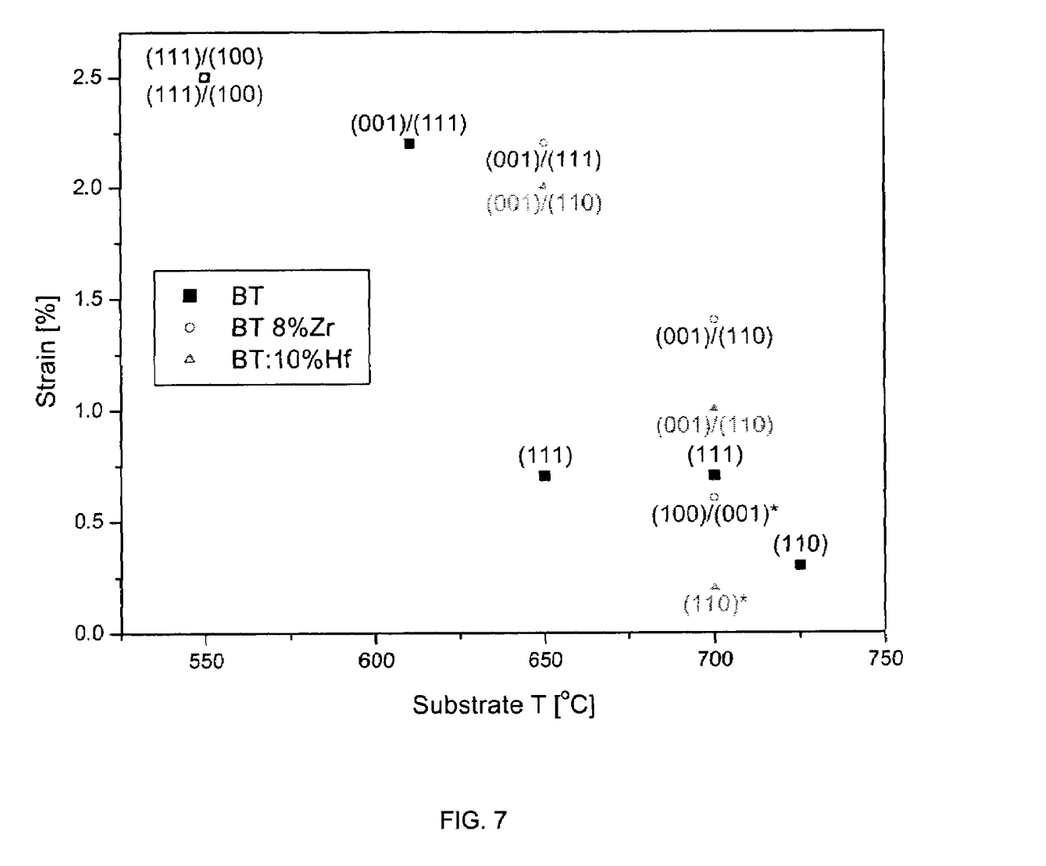
FIG. 7 is a graph demonstrating changes in strain and orientation of the titanates

X-ray diffraction confirmed the phase is $BaTiO_3$, as shown in FIG. 6A. The split observed in the x-ray diffraction of the modified barium titanate corresponds to the expected rhombohedral phase shown in FIG. 6B. An ω scan around the barium titanate gave a FWHM of <0.5, indicating high level of orientation in the film. The changes in strain and orientation, as measured from the x-ray, are summarized in FIG. 7. The strain decreases with increasing growth temperature. Forming the solid solution helps stabilize desired orientation.

Figure 8:
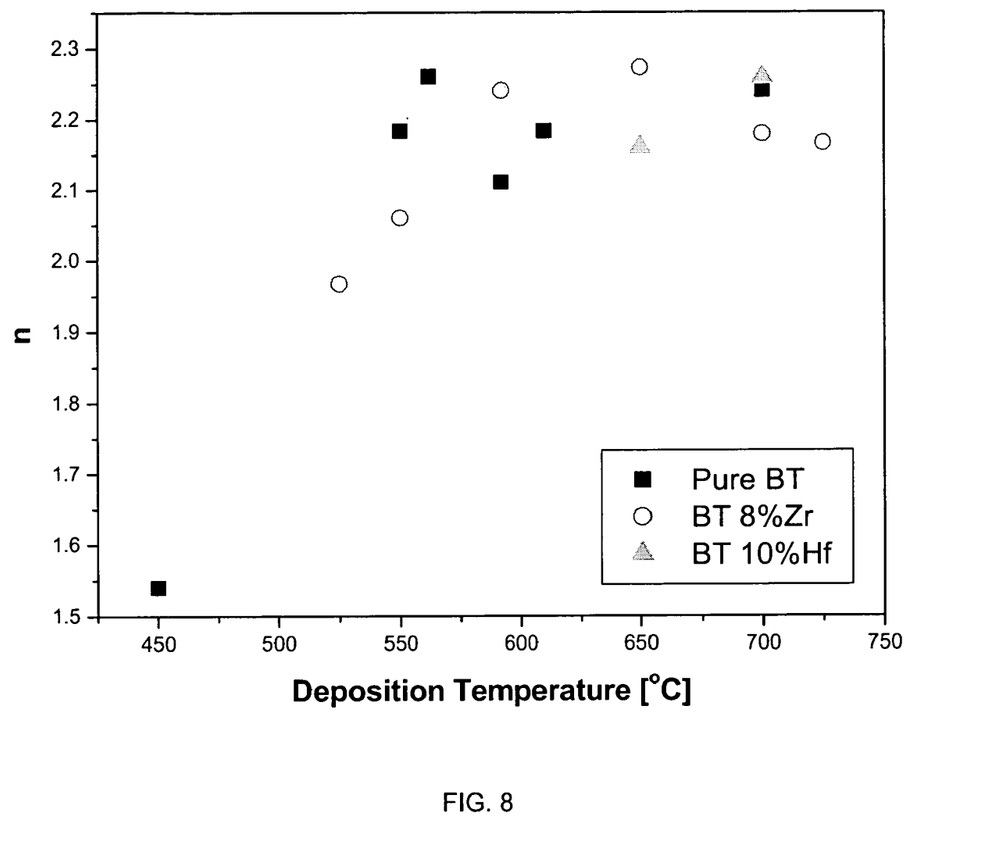
FIGS. 8 and 9 are graphs depicting optical properties of the titanates.
Figure 9:
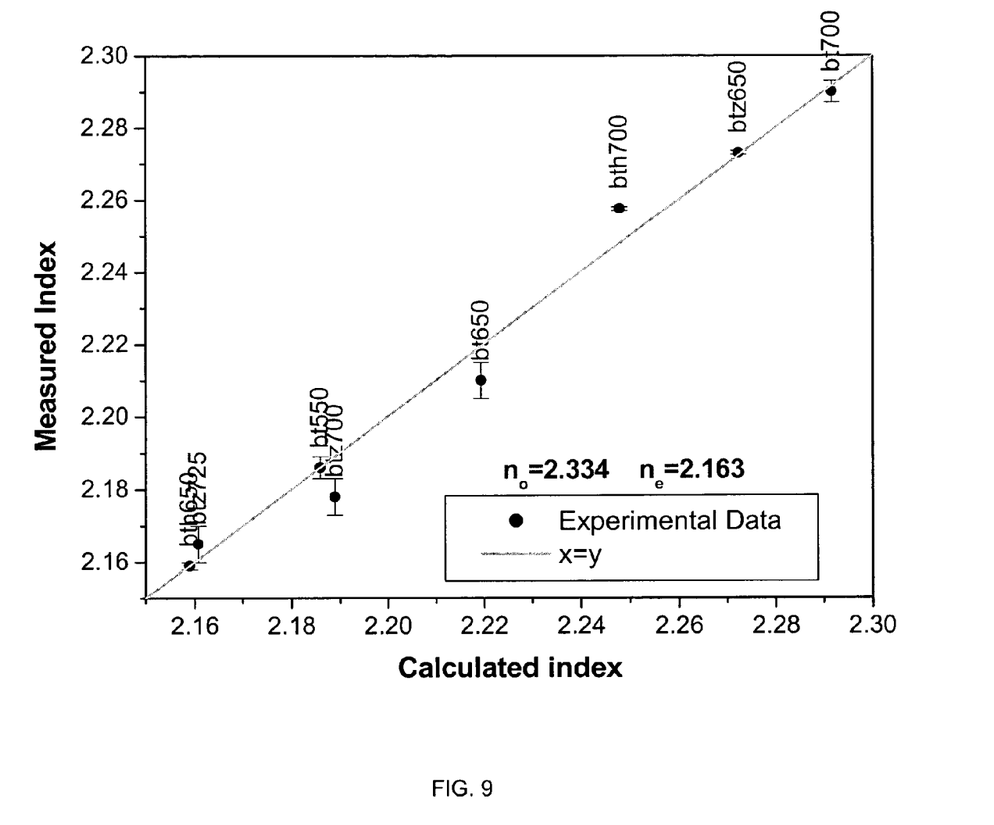

The refractive index of the film was measured at a wavelength of 633 nm by ellipsometry. The dependency of the refractive index on the growth temperature and composition is shown in FIG. 8. The refractive index can be related to the orientation and strain in the film, as measured by x-ray diffraction, according to a simple Clausius-Mossotti model, as shown in FIG. 9. Although these measurements were done at 633 nm, similar results are expected at other wavelengths, including those important for optical communications.

Figure 10A:
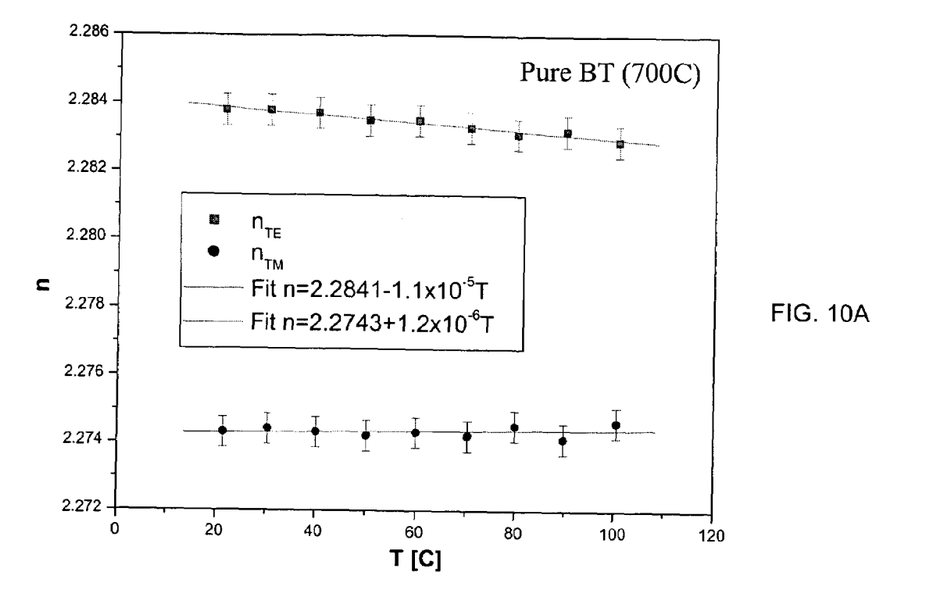
FIGS. 10A–10B are graphs demonstrating characteristics of pure and modified titanates.
Figure 10B:
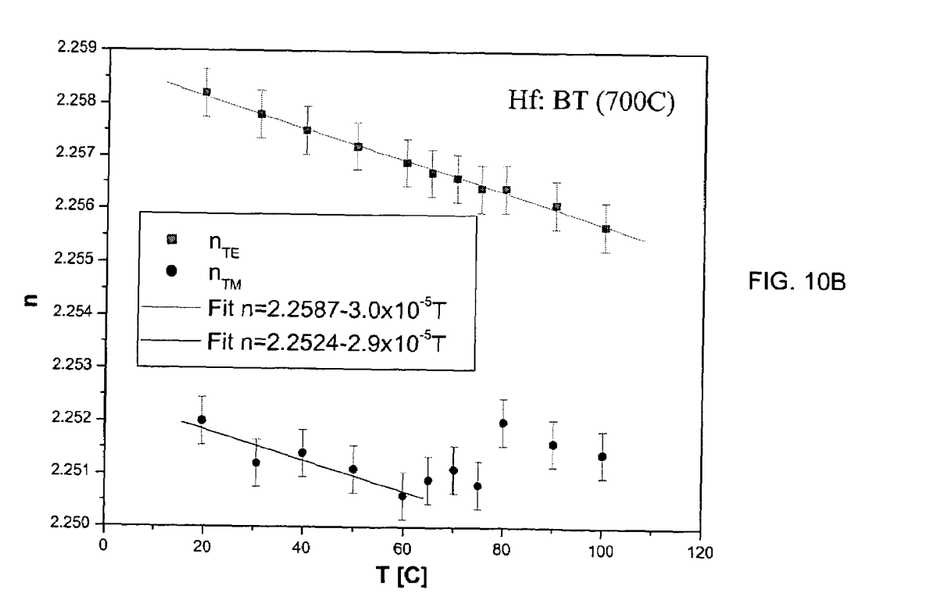

Mode dependent index measurements were performed at a wavelength of 1550 nm (optical communications wavelength) as a function of temperature. The data for pure barium titanate is shown in FIG. 10A and modified barium titanate is shown in FIG. 10B. The phase transitions in the modified barium titanate are apparent in the TM mode index at 60° C. and 80° C. This supports the x-ray results of having the expected rhombohedral phase at room temperature. These transitions are not seen in the pure barium titanate, suggesting it is in the expected tetragonal phase.

In general, the films of stabilized barium titanate on MgO were homogeneous films with low surface roughness. The stabilization additives (Zr, Hf) lowered the deposition temperature to achieve the desired orientation and positively influence the index of refraction, orientation and strain. The films were homogeneous.

Although the present invention has been shown and described with respect to several preferred embodiments thereof, various changes, omissions and additions to the form and detail thereof, may be made therein, without departing from the spirit and scope of the invention.

What is claimed is:

1. An optical structure comprising:
    a substrate having a surface; and
    a modified barium titanate thin film deposited on said surface of said substrate,
    wherein said substrate comprises Si or SOI with an optical buffer layer, the modified barium titanate comprises barium titanate including 2 to 20 mol % of Zr (Ba-$ZrO_3$), the optical buffer layer has a refractive index lower than a refractive index of the modified barium titanate, and the optical buffer layer is suitable for confining an optical signal in the modified barium titanate thin film by optically isolating the modified barium titanate film from the substrate comprising silicon.

2. The structure of claim 1, wherein said optical buffer layer comprises MgO, YSZ, $CeO_2$, $SiO_2$, or a combination thereof.

3. The structure of claim 1, further comprising electrodes on a surface of the modified barium titanate thin film, configured to form an electro-optic structure.

4. A method of forming an optical structure comprising:
providing a substrate having a surface; and
depositing a modified barium titanate thin film on said surface of said substrate,
wherein the modified barium titanate thin film comprises barium titanate including 2 to 20 mol % of Zr ($BaZrO_3$), said substrate comprises Si or SOI with an optical buffer layer, the optical buffer layer has a refractive index lower than a refractive index of the modified barium titanate, and the optical buffer layer is suitable for confining an optical signal in the modified barium titanate thin film by optically isolating the modified barium titanate film from the substrate comprising silicon.

5. The method of claim 4 further comprising placing electrodes on a surface of the modified barium titanate thin film configured to form an electro-optic structure.

6. The method of claim 4, wherein said optical buffer layer comprises any of MgO, YSZ, $CeO_2$, $SiO_2$, or a combination thereof.

* * * * *